Patented Aug. 17, 1937

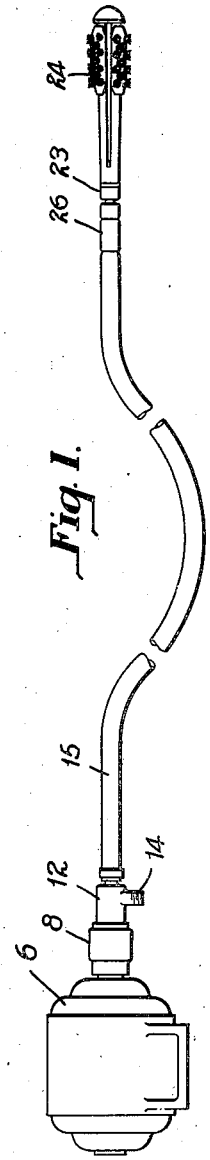
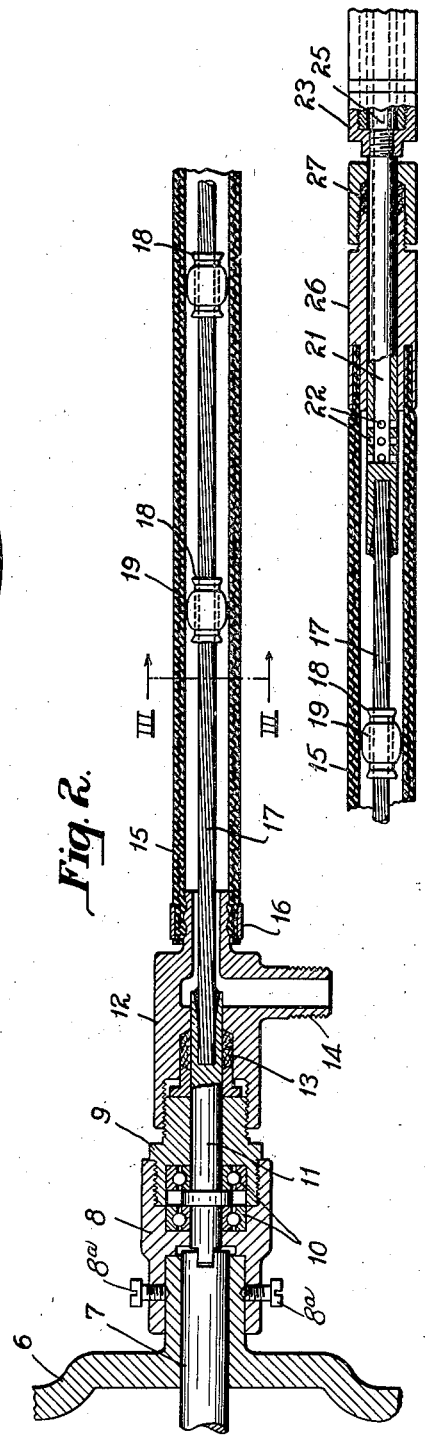
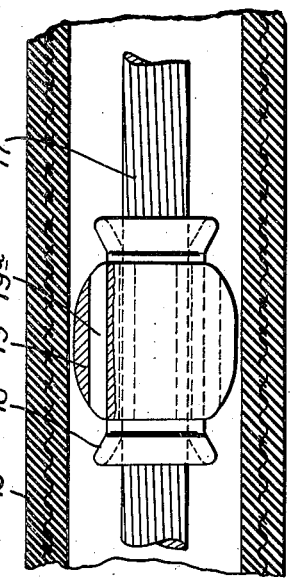
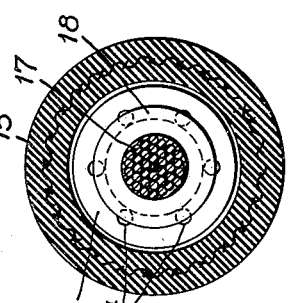

2,090,174

UNITED STATES PATENT OFFICE 2,090,174

FLEXIBLE DRIVE SHAFT

William Fredrick Albright, Pittsburgh, Pa.

Application August 7, 1935, Serial No. 35,157

2 Claims. (Cl. 64—2)

My invention relates to flexible drive shafts and is hereinafter described as especially suitable for use in connection with tube cleaners and the like, such as are employed in the removal of scale from tubes of boilers, condensers, stills, water lines, gas lines, and from milk pipes, and other receptacles in dairy plants, etc.

It will be understood, of course, that various features of the invention are capable of use in connection with various other types of apparatus.

One object of my invention is to provide a flexible drive shaft structure with an improved manner of directing water or other liquid therethrough, which liquid may serve not only to lubricate the shaft bearings, but also as a flushing or cleaning medium.

Another object of my invention is to provide a structure embodying a flexible drive shaft and cleaning element of such form that the cleaning tool can be readily manipulated and conveniently permit of its being brought into engagement with variously-disposed surfaces to be cleaned.

One form which my invention may take is shown in the accompanying drawing wherein Figure 1 is a side view thereof; Fig. 2 is a broken sectional view, on an enlarged scale, of a portion of the structure of Fig. 1; Fig. 3 is a view, on a still further enlarged scale, taken on the line III—III of Fig. 2, and Fig. 4 is a longitudinal sectional view of the structure of Fig. 3.

The structure includes a motor casing 6 which may be driven electrically or otherwise, and is provided with a motor shaft 7. A bearing housing or bushing member 8 is secured to an extension of the motor casing by set screws 8a, and a bearing bushing 9 has screw-threaded engagement with the housing 8. Ball races 10 are rigidly secured to the members 8 and 9 by press fit or otherwise, and carry a shaft 11, the inner end of which has driving connection with the motor shaft 7. The driven shaft together with the bearing members can be separated from the motor shaft 7 simply by loosening the set screws which connect the housing 8 to the motor casing. An annular flange or shoulder 11a formed on the shaft 11 has thrust engagement with the two parts of the bearing 10, to thereby hold the shaft against shifting axially either when in use or when the drive is detached from a motor. This arrangement insures better maintenance of a fluid-tight seal at the stuffing box hereinafter referred to, and hence reduces danger of leakage along the shaft.

A T 12, provided with a stuffing box 13, has threaded engagement with the bushing 9, the stuffing box serving to prevent leakage of water to the motor. A packing gland 13a is engaged by the adjacent end of the bushing member 9 and serves to effectively compress the packing in the stuffing box when the members 9 and 12 are screwed together. The T 12 is provided with an inlet stem 14 through which water or other liquid may enter from a hose or other means of supply and flow through a shaft casing 15 that may suitably be of armored or reinforced rubber, and which is readily flexible. The casing 15 is connected to the T 12 by a hose clamp 16.

A flexible drive shaft 17, which may be in the form of a wire rope or other suitable material, is securely fastened at one end to the shaft 11. At suitable distances apart, the shaft 17 is provided with metal bushings 18 that have snug fit with the shaft so that they will turn therewith. Metal collars 19 surround the sleeves 18 and are of slightly less diameter than the internal diameter of the casing 15, as shown more clearly in Fig. 4, so as to permit flow of water toward the front of the casing 15, the water serving to also lubricate the bearings at 19. To insure adequate flow of flushing water, I may provide holes or passageways 19a in the collars 19.

The collars 19 are loose on the sleeves 18, and serve as bearings therefor and as spacers to prevent rubbing of the shaft and the sleeves against the casing 15. The peripheral surfaces of the collars are curved also in the direction of their axes, so that they will not interfere with the flexing of the casing 15. A sufficient number of sleeves 18 and collars 19 will be provided to prevent excessive whipping of the shaft 17 and to prevent rubbing of the shaft on the casing wall, even when the casing 15 is bent. The flared ends of the sleeves 18 facilitate bending of the shaft 17 with less danger of binding or abrasion thereof in its bearings.

The shaft 17 near its front end is rigidly connected to a tubular shaft member 21 that is provided with holes 22 near its rear end to permit entry of water from the shaft casing 15. At its forward end, the shaft 21 is connected to a stock 23 which carries brushes or other cleaning elements 24 that may be of various forms such as those shown, for example, in my Patent No. 1,978,853, issued October 30, 1934, and my patent application Serial No. 751,849, filed November 7, 1934.

A tube 25 is threaded into the base of the stock 23 and receives water which passes through the shaft member 21, the water eventually being discharged from openings in the front portion of the tube 25, at the cleaning head 24, as in my previous disclosures. The stock 23 will, of course, be rotated with the shaft 17.

At its front end, the shaft casing 15 is rigidly connected to a metal sleeve 26 that serves also as a bearing for the shaft member 21. A stuffing box 27 is provided for preventing leakage through the sleeve 26, although sufficient water may enter the sleeve to lubricate the shaft member 21.

It will be seen that by reason of the flexible shaft structure, the cleaning tool may be readily inserted into various locations which are ordinarily difficult of access with tube cleaners of the usual type, and while the cleaning head 24 is being rotated and water supplied thereto.

I claim as my invention:—

1. Driving mechanism comprising a bearing bushing formed in axially-separable sections, means for connecting the bushing to the bearing of a main drive shaft, a second drive shaft supported in said bushing and having an annular shoulder, means for detachably connecting the second shaft to the first-named shaft, a two-part bearing for the second shaft, each part mounted in one of the bushing elements, and the said shoulder being disposed between said bearing parts, a hollow T element having its one branch serving as a fluid inlet, means connecting a second branch of the T to the bushing, a stuffing box in said branch and surrounding the second-named shaft, a flexible shaft extending through the third branch of the T with clearance sufficient to permit flow of fluid through said branch and having connection with the second-named shaft, and a flexible casing surrounding the flexible shaft and connected at its rear end to the third branch of the T.

2. Driving mechanism comprising a bearing bushing, means for connecting the bushing to the bearing of a main drive shaft, a second drive shaft supported in said bushing, means for detachably connecting the second shaft to the first-named shaft, a bearing for the second shaft, having an annular recess intermediate its ends, a shoulder on the shaft, fitting within said recess, to prevent longitudinal movement of the shaft, in said bushing, a hollow T element having its one branch serving as a fluid inlet, means connecting a second branch of the T to the bushing, a stuffing box in said branch and surrounding the second-named shaft, a flexible shaft extending through the third branch of the T with clearance sufficient to permit flow of fluid through said branch and having connection with the second-named shaft, and a flexible casing surrounding the flexible shaft and connected at its rear end to the third branch of the T, the said bushing having screw threaded connection with the T and arranged to compress the packing in the stuffing box when the parts are screwed together.

WILLIAM F. ALBRIGHT.